(12) United States Patent
Becue et al.

(10) Patent No.: US 6,551,564 B1
(45) Date of Patent: Apr. 22, 2003

(54) PROCESS FOR ELIMINATING OXIDES OF NITROGEN

(75) Inventors: Thierry Becue, Paris (FR); Gil Mabilon, Carrieres sur Seine (FR); Philippe Villeret, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 28 days.

(21) Appl. No.: 09/707,772

(22) Filed: Nov. 8, 2000

(30) Foreign Application Priority Data

Nov. 10, 1999 (FR) .............................. 99 14144

(51) Int. Cl.[7] .............................................. B01D 53/56
(52) U.S. Cl. ................. 423/239.1; 423/213.2; 423/213.5
(58) Field of Search ............... 423/213.2, 213.5, 423/239.1

(56) References Cited

U.S. PATENT DOCUMENTS

| | | | |
|---|---|---|---|
| 3,897,367 A | 7/1975 | Lauder | 252/462 |
| 3,900,428 A | 8/1975 | Mai et al. | 252/462 |
| 4,151,123 A | 4/1979 | McCann, III | 252/462 |
| 5,340,562 A | 8/1994 | O'Young et al. | 423/599 |
| 5,756,057 A | 5/1998 | Tsuchitani et al. | 423/213.2 |
| 5,800,793 A | 9/1998 | Cole | 423/213.2 |
| 5,898,015 A | 4/1999 | Yokoi et al. | 502/414 |
| 5,906,958 A | 5/1999 | Park et al. | 502/324 |
| 6,001,319 A | * 12/1999 | Yokoi et al. | 423/239.1 |

FOREIGN PATENT DOCUMENTS

EP 0 710 622 A1 5/1996

* cited by examiner

Primary Examiner—Stanley S. Silverman
Assistant Examiner—Maribel Medina
(74) Attorney, Agent, or Firm—Millen, White, Zelano & Branigan, P.C.

(57) ABSTRACT

The invention concerns materials for eliminating oxides of nitrogen NO and $NO_2$ present in exhaust gases, in particular from the internal combustion engines of automotive vehicles operating in a medium which is super-stoichiometric in oxidising agents, which can adsorb oxides of nitrogen then desorb the oxides of nitrogen by elevating the temperature with respect to the adsorption temperature or by passage of rich mixture, said materials comprising mixed oxides the metals of which are in octahedral coordination, with the octahedra connecting together so that the structure generates micropores in the form of channels. These materials adsorb oxides of nitrogen by insertion and do not become poisoned in contact with oxides of sulphur and carbon contained in the gases. In the presence of a group VIII metal, these materials are capable of eliminating oxides of nitrogen absorbed by reduction during passage of a rich mixture.

24 Claims, 1 Drawing Sheet

PROCESS FOR ELIMINATING OXIDES OF NITROGEN

TECHNICAL FIELD

Figure 1:
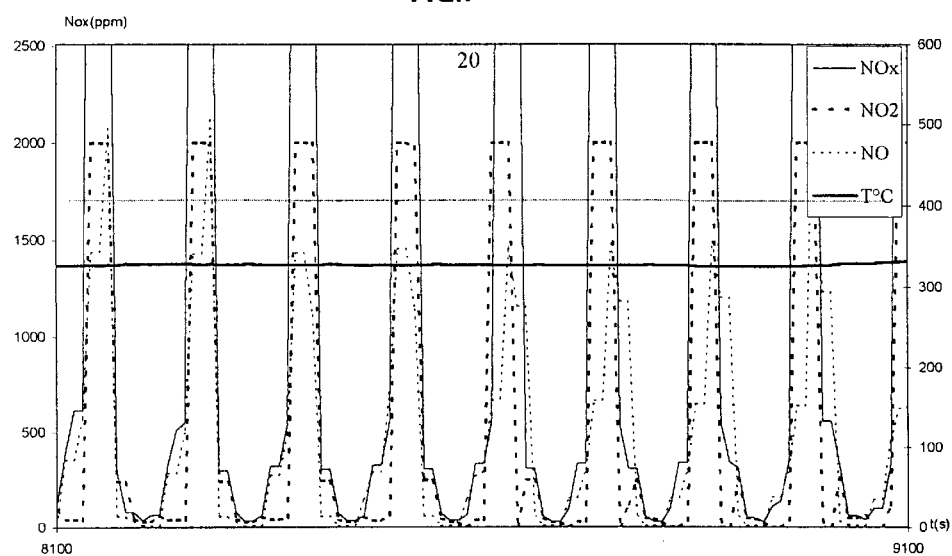

The present invention relates to materials which encourage elimination, by adsorption, of oxides of nitrogen (NO and $NO_2$, usually termed $NO_x$) present in a gas mixture which may be super-stoichiometric in oxidising compounds, and in particular in oxygen, said materials not being poisoned by the sulphur-containing products present in those gases. The invention is applicable to eliminating oxides of nitrogen ($NO_x$) present in the exhaust gases from automotive vehicles, in particular from vehicles functioning with diesel fuel.

PRIOR ART

The high toxicity of oxides of nitrogen and their role in the formation of acid rain and tropospheric ozone have led to the instigation of strict regulations limiting the discharge of such compounds. In order to satisfy those regulations, it is generally necessary to eliminate at least a portion of such oxides present in exhaust gases from automotive or stationary engines and from turbines.

The elimination of oxides of nitrogen by thermal decomposition or, as is preferable, by catalytic decomposition can be envisaged, but the high temperatures demanded by this reaction are incompatible with those of the exhaust gases. Only catalytic reduction of oxides of nitrogen to nitrogen is possible using the reducing agents which are present, albeit in small quantities, in the exhaust gases (CO, $H_2$, unburned hydrocarbons or where combustion in the engine has been imperfect), and also by injecting a complement to those reducing compounds upstream of the catalyst. Such reducing agents are hydrocarbons, alcohols, ethers or other oxygen-containing compounds; they can also be a liquid or gaseous fuel (under pressure, CNG, or liquefied, LPG) feeding the engine or turbine.

European patent EP-A1-0 540 280 describes an apparatus for reducing emissions of oxides of nitrogen in the exhaust gases from internal combustion engines, which comprises a material for adsorbing and desorbing oxides of nitrogen. In that process, the oxides of nitrogen are stored in the form of nitrates when the engine is burning lean, i.e., depleted in hydrocarbons. However the storage capacity of a trap operating using that principle is generally deteriorated by adsorption of sulphur-containing products contained in the exhaust gas which form sulphates which are more stable than the nitrates, poisoning the trap.

Further, following $NO_x$ trapping, a step for desorbing the oxides of nitrogen must be carried out followed by their reduction. Devices for catalysed oxidation treatment of carbon monoxide CO and hydrocarbons HC contained in the exhaust gases are known which, for example, use catalysts for reducing oxides of nitrogen, known as $DeNO_x$ catalysts, which are active for reducing $NO_x$ in temperature ranges in the range 200° C. to 350° C. and which comprise, for example, precious metals on oxide supports such as platinum or palladium deposited on an alumina, titanium oxide or zirconium support, or by perovskites, or in temperature ranges in the range 350° C. to 600° C. comprising, for example, hydrothermally stable zeolites (for example Cu-ZSM5). A device for treating exhaust gases from a compression ignition engine comprising a catalyst and an oxides of nitrogen adsorbent placed in to the exhaust collector has been described, for example, in patents EP-A1-0 540 280 and EP-A1-0 718 478.

Thus a material behaving as a trap for oxides of nitrogen has to be capable of adsorbing the oxides of nitrogen at low temperatures up to the temperature necessary for the $NO_x$ reduction catalyst to function, the trap then allowing the oxides of nitrogen coming into contact with the $DeNO_x$ catalyst to desorb at a temperature sufficient to trigger the $NO_x$ reduction reaction.

Oxides with a crystallographic structure which generates channels with a size sufficient to accommodate oxides of nitrogen have been described (Japanese patents JP09075715A and JP09075718A). The solids used in those patents are mixed oxides with the crystallographic structure of hollandite and specific formulations $K_{3.6}Zn_{1.8}Sn_{6.2}O_{16}$ and $K_{1.8}Al_{1.8}Sn_{6.2}O_{16}$.

French patent FR-A-2 733 924 describes a material with formula $YBa_2Cu_3O_{7-x}$ which can integrate the oxides of nitrogen in the mixed oxide composing the material. That patent indicates that the material, after being charged with oxides of nitrogen, is transformed by passing from an orthorhombic structure which is rich in oxygen to a tetragonal structure which is depleted in oxygen when the oxygen content of the gas reduces, and that phase transition causes desorption of oxides of nitrogen. According to that process, it is possible to influence adsorption and desorption of the oxides of nitrogen by varying the amounts of oxygen in the exhaust gases. It has recently been demonstrated (K-Y Lee, K. Watanabe, M. Misono, Applied Catalysis B 13, 241 (1997)) that the adsorption of $NO_x$ in the presence of oxygen on the material $YBa_2Cu_3O_{7-x}$ leads to the formation of barium nitrate species ($Ba(NO_3)_2$). That same study also showed that that material suffers a dramatic loss of its oxides of nitrogen adsorption properties in the presence of carbon dioxide by forming barium carbonates. Since barium sulphate species are more stable than the nitrate species, it is feared that a compound of the $YBa_2Cu_3O_{7-x}$ type is also poisoned in the presence of sulphur dioxide by forming sulphate species on the oxides of nitrogen adsorption sites.

The materials of the present patent can be found in the natural state or they can be synthesised in the laboratory. EP-A-0 623 556 and EP-A-0 710 622, for example, describe methods for producing certain of such solids. Further, among such solids, materials based on manganese and with channels with sufficient diameters for inserting $NO_x$ have been described in the Gmelin Handbook (Gmelin Handbook of Inorganic and Organometallic Chemistry, Mn no 56, A5b1, Springer-Verlag, 1996).

SUMMARY OF THE INVENTION

The invention concerns materials for eliminating oxides of nitrogen NO and $NO_2$ ($NO_x$) in particular those present in exhaust gases, for example internal combustion engines of automotive vehicles operating in a medium which is super-stoichiometric in oxidising agents, said materials being capable of adsorbing $NO_x$ and which can desorb $NO_x$ by raising the temperature or by treatment with a mixture which is rich in reducing agents. The materials are mixed oxides the framework of which is constituted by metal cations M each surrounded by 6 oxygen atoms and wherein the octahedra ($MO_6$) thus formed are connected together by edges and peaks generating a structure which produces unidirectional channels.

SIGNIFICANCE OF THE INVENTION

The material of the invention can trap oxides of nitrogen at low temperatures and desorb them at the temperature at which a DeNOx catalyst is capable of reducing them. These materials are insensitive to the oxides of sulphur and carbon contained in the exhaust gases, which prevents the materials from being poisoned. The materials adsorb oxides of nitrogen over a wide temperature range while desorption is carried out in a very narrow temperature range which means that thermal regeneration is easy to control. During desorption, the oxides of nitrogen which have been adsorbed are released in bursts with a high $NO_x$ concentration, which is beneficial to the reaction kinetics for reduction of the desorbed oxides of nitrogen. The kinetics of the reduction of $NO_x$ by hydrocarbons are positive with respect to the oxides of nitrogen species. Said material does not have a basic oxide phase which substantially stabilises the oxides of nitrogen and oxides of sulphur into the nitrate and sulphate forms respectively. The $SO_x$ which can be inserted with the $NO_x$ into the structure of the material of the invention are desorbed in a temperature range which is similar to that of the $NO_x$. Preventing the formation of stable sulphates ensures that poisoning of the adsorbing material is minimal, meaning that the regeneration frequency and the regeneration temperature are lower, and thus the service life of the $NO_x$ trap is longer, and there an energy gain.

The material of the invention can also allow chemical desorption by varying the chemical composition of the gas containing the oxides of nitrogen. In a particular implementation of the invention, combining the materials claimed by the Applicant with a metal from group VIII eliminates adsorbed $NO_x$ by reduction during passage of a rich mixture.

DESCRIPTION OF THE INVENTION

The present invention concerns materials for adsorbing and desorbing oxides of nitrogen the structure of which is composed of octahedra ($MO_6$), M being selected from elements from groups IIIB to IIIA in the periodic table. Preferably, this element (M) has an oxidation number of close to 4. Said material has a characteristic structure which generates channels into which the $NO_x$ can insert at low temperatures and leave at a higher temperature. The sides of these channels are formed by linking the octahedra ($MO_6$) which connect together by the edges, these sides connecting themselves together via the peaks of the octahedra. Thus the width of the channels can vary depending on the mode of preparation, depending on whether the sides are composed of 2 or 3 octahedra ($MO_6$). This type of material is known by its acronym OMS, Octahedral Molecular Sieves. The materials are selected from materials with a cryptomelane, hollandite, romanechite or todorokite structure.

More precisely, the invention concerns a process for eliminating oxides of nitrogen in an exhaust gas, in particular from an automotive vehicle internal combustion engine, in the presence of an OMS type material.

The adsorbent phase of the materials used in the process of the invention has a three-dimensional structure which generates channels in at least one direction in space, is composed of octahedra ($MO_6$) and comprises:

- at least one element (M) selected from the group formed by elements from groups IIIB, IVB, VB, VIB, VIIB, IB, IIB, IIIA of the periodic table, each element M being coordinated with 6 oxygen atoms, and located at the centre of the oxygen octahedra;
- at least one element (B) selected from the group formed by the alkali elements IA, the alkaline-earth elements IIA, the rare earths IIB, transition metals or elements from groups IIIA and IVA, element B generally being located in channels in the oxide structure.

Preferably, the octahedra contain no tin. Highly preferably, they also contain no group IVA element.

In one embodiment of the invention, the material optionally comprises at least one metal (C) selected from the group formed by precious metals from the platinum family (group VIII).

This embodiment allows subsequent reduction of $NO_x$ during adsorption then desorption. The material of the invention thus surprisingly carries out the three steps with a single material.

Elements M are selected from scandium, yttrium, lanthanum, titanium, zirconium, hafnium, vanadium, niobium, tantalum, chromium, molybdenum, tungsten, manganese, rhenium, iron, ruthenium, osmium, cobalt, rhodium, iridium, nickel, palladium, platinum, copper, silver, gold, zinc, cadmium, gallium, aluminium, indium and thallium.

The sum of the charges (oxidation number) carried by the cation or cations M from groups IIB to IIIA is preferably about +4. At least the major portion of elements (M) is preferably selected from manganese, tungsten, zirconium, molybdenum, chromium, titanium and a mixture of at least two of these elements, preferably manganese, titanium and zirconium. Other elements M from groups IIB to IIIA can be added in minor quantities as dopants. Preferably, the elements from groups IIIB to IIIA added in minor quantities are selected from aluminium, zinc, copper, nickel, cobalt, iron, chromium, scandium, yttrium, gallium, cadmium and indium, and more preferably selected from aluminium, zinc, cadmium, scandium and yttrium.

Elements (B) belong to the group formed by the alkali elements IA, alkaline-earth elements IIA, rare earth elements IIIB or transition metals. They are located in the channels of the material. An alkali or alkaline-earth metal such as potassium, barium or strontium is preferred.

Elements (C) belong to the group formed by platinum, palladium, rhodium, ruthenium, iridium and osmium, preferably platinum. This embodiment of the invention comprising at least one element (C) selected from noble metals from group VIII can oxidise NO to $NO_2$.

The adsorbing phase of the invention has the following composition by weight, expressed as the percentage by weight with respect to the total mass of this active phase calcined at 1000° C. for 4 hours:

- 40% to 80% of at least one metal M, preferably 50% to 75%;
- 0.01% to 30%, preferably 1.5% to 20%, of at least one element (B) selected from the group formed by alkali elements, alkaline-earth elements, rare earth elements, transition metals and elements from groups IIIA and IVA of the periodic table;
- optionally, 0.05% to 5% of at least one metal (C) selected from the group formed by the precious metals from group VIII, the platinum family.

The complement is formed by the oxygen of the corresponding oxides.

A number of different methods exist for preparing such materials (S. L. Suib, C-L O'Young, "Synthesis of Porous Materials", M. L. Occelli, H. Kessler, eds, M. Dekker, Inc., p. 215, 1997). They may be synthesised by mixing and grinding solid inorganic precursors of metals M and B, followed by calcining. The materials can also be obtained by heating solutions of precursor salts to reflux, drying and calcining, by precipitating precursor salts or by hydrothermal synthesis which consists of heating an aqueous solution containing the elements constituting the final material under autogenous pressure. The materials obtained from these syntheses can be modified by ion exchange or isomorphous substitution.

Optional metal (C) is introduced using any of the methods known to the skilled person: excess impregnation, dry impregnation, ion exchange, etc.

The material of the invention generally has a specific surface area in the range 20 to 300 $m^2/g$.

The adsorbent phases can be in the form of a powder, beads, pellets or extrudates; they can also be deposited or directly prepared on monolithic supports of ceramic or metal. Advantageously, in order to increase the dispersion of the materials and thus to increase their capacity to adsorb $NO_x$, the materials can be deposited on large specific surface area porous supports such as silica or alumina ($SiO_2$, $Al_2O_3$, $TiO_2$, $ZrO_2$, SiC, MgO ...) before being formed (extrusion, coating ...). These supports are generally selected from the group formed by the following compounds: alumina (alpha, beta, delta, gamma, khi, or theta alumina), silicas, silica-aluminas, zeolites, titanium oxide, zirconium oxide, divided carbides, for example silicon carbides, used alone or as a mixture. Mixed oxides or solid solutions comprising at least two of the above oxides can be added.

However, for use in a vehicle, it is usually preferable to use rigid supports (monoliths) with a large open porosity (more than 70%) to limit pressure drops which may cause high gas flow rates, and in particular high exhaust gas space velocities. These pressure drops are deleterious to proper functioning of the engine and contribute to reducing the efficiency of an internal combustion engine (gasoline or diesel). Further, the exhaust system is subjected to vibrations and to substantial mechanical and thermal shocks, so catalysts in the form of beads, pellets or extrudates run the risk of deterioration due to wear or fracturing.

Two techniques are used to prepare the catalysts of the invention on monolithic ceramic or metal supports (or substrates).

The first technique comprises direct deposition on the monolithic support, using a wash coating technique which is known to the skilled person, to coat the adsorbing phase prepared using the operating procedure described, for example, in the reference (S. L. Suib, C-L O'Young, "Synthesis of Porous Materials", M. L. Occelli, H. Kessler, eds, M. Dekker, Inc., p. 215, 1997). The adsorbent phase can be coated just after the co-precipitation step, hydrothermal synthesis step or heating under reflux step, the final calcining step being carried out on the phase deposited on the monolith, or the monolith can be coated after the material has been prepared in its final state, i.e., after the final calcining step.

The second technique comprises firstly depositing the inorganic oxide on the monolithic support then calcining the monolith between 500° C. and 1100° C. so that the specific surface area of this oxide is in the range 20 to 150 $m^2/g$, then coating the monolithic substrate covered with the inorganic oxide with the adsorbent phase obtained after the steps described in the reference (S. L. Suib, C-L O'Young, "Synthesis of Porous Materials", M. L. Occelli, H. Kessler, eds, M. Dekker, Inc., p. 215, 1997).

The monolithic supports which can be used are:
either ceramic, where the principal elements can be alumina, zirconia, cordierite, mullite, silica, alumino-silicates or a combination of several of these compounds;
or a silicon carbide and/or nitride;
or aluminium titanate;
or of metal, generally obtained from iron, chromium or aluminium alloys optionally doped with nickel, cobalt, cerium or yttrium.

The structure of the ceramic supports is that of a honeycomb or they are in the form of a foam or fibres.

Metal supports can be produced by winding corrugated strips or by stacking corrugated sheets to constitute a honeycomb structure with straight or zigzag channels which may or may not communicate with each other. They can also be produced from metal fibres or wires which are interlocked, woven or braided.

With supports of metal comprising aluminium in their composition, it is recommended that they are pre-treated at high temperature (for example between 700° C. and 1100° C.) to develop a micro-layer of refractory alumina on the surface. This superficial micro-layer, with a porosity and specific surface area which is higher than that of the original metal, encourages adhesion of the active phase and protects the remainder of the support against corrosion.

The quantity of adsorbent phase deposited or prepared directly on the ceramic or metallic support (or substrate) is generally in the range 20 to 300 g per liter of said support, advantageously in the range 50 to 200 g per liter.

The materials of the invention can thus adsorb and desorb oxides of nitrogen present in the gases, in particular exhaust gases.

These materials are characterized in that they are capable of adsorbing $NO_x$ at a temperature which is generally in the range 50° C. to 400° C., preferably in the range 100° C. to 350° C., more preferably in the range 150° C. to 300° C. Said oxides of nitrogen can be desorbed at a temperature generally in the range 300° C. to 500° C., preferably in the range 350° C. to 450° C. they can also be desorbed by varying the composition of the gas, for example by suddenly increasing the concentration of reducing compounds such as hydrocarbons, hydrogen, carbon monoxide, at temperatures in the range 150° C. to 500° C., preferably in the range 200° C. to 450° C., more preferably in the range 300° C. to 400° C. Thermally or chemically, oxides of nitrogen desorption can be triggered in temperature ranges were conventional $NO_x$ reduction catalysts are effective. Further, the thermal desorption of the invention can take place within narrow ranges of temperature generally within a range of 80° C. For diesel cars the temperature of the exhaust gas is generally in the range 150° C. to 300° C. and rarely exceeds 500° C. The materials used in the process of the invention are thus suitable for adsorbing oxides of nitrogen present in the exhaust gases of stationary engines or, particularly, automotive diesel engines or spark ignition (lean burn) engines, but also in the gases from gas turbines operating with gas or liquid fuels. These gases are also characterized by oxides of nitrogen contents of a few tens to a few thousands of parts per million (ppm) and can contain comparable amounts of reducing compounds (CO, $H_2$, hydrocarbons) and sulphur, also large quantities of oxygen (1% to close to 20% by volume) and steam. The material of the invention can be used with HSVs (hourly space velocity, corresponding to the ratio of the volume of the monolith to the gas flow rate) of the exhaust gas generally in the range 500 to 150000 $h^{-1}$, for example in the range 5000 to 100000 $h^{-1}$.

The invention also concerns the use of materials for adsorbing and desorbing oxides of nitrogen in a process for eliminating oxides of nitrogen, more particularly in a medium which is super-stoichiometric in oxidising agents. Thus the material of the invention can be used in a process comprising:

a step for adsorbing at least a portion of said oxides of nitrogen onto an adsorption material as defined in the present invention;

a step for desorbing the oxides of nitrogen carried out by increasing the temperature or by varying the composition of the exhaust gases;

a step for selective reduction of at least a portion of the oxides of nitrogen to molecular nitrogen by reducing agents in the presence of at least one catalyst for reducing oxides of nitrogen.

Thus the process for eliminating oxides of nitrogen comprises, during the step for reducing the oxides of nitrogen, using a catalyst which is active and selective using reducing agents to reduce oxides of nitrogen to molecular nitrogen in a medium which is super-stoichiometric in oxidising agents. Catalysts for reducing oxides of nitrogen to nitrogen or nitrous oxide generally comprise at least one inorganic refractory oxide and can comprise at least one zeolite selected, for example, from MFI, NU-86, NU-87 and EU-1 zeolites and generally at least one element selected from elements from transition metal groups VIB, VIIB, VIII and IB. These catalysts can optionally contain at least one element selected from noble metals from group VIII, for example platinum, rhodium, ruthenium, iridium, palladium and optionally at least one element selected from elements from groups IIA, the alkaline-earths and IIIB, the rare earths. Examples of catalysts for reducing oxides of nitrogen include the following combinations: Cu-ZSM5, Cu-MFI, Fe-MFI, Fe-ZSM5, Ce-MFI, Ce-ZSM5, Pt-MFI, Pt-ZSM5.

The refractory inorganic oxide is selected from supports of the type $Al_2O_3$, $SiO_2$, $ZrO_2$ and $TiO_2$, preferably alumina.

The reducing agents are selected from CO, $H_2$, hydrocarbons, present in the fuel or added in the form of fresh products.

In the case where the material for adsorbing oxides of nitrogen of the present invention contains at least one element (C) selected from noble metals from group VIII of the periodic table, the process for eliminating oxides of nitrogen comprises:

a step for adsorbing at least a portion of said oxides of nitrogen on the material as defined in the present invention;

a step for desorbing the oxides of nitrogen;

a step for selective reduction of at least a portion of the oxides of nitrogen to molecular nitrogen in the presence of reducing compounds on the material as defined in the present invention.

Thus reducing oxides of nitrogen to nitrogen or nitrous oxide can take place directly on the adsorption material of the invention which permits both trapping of the oxides of nitrogen, desorption of said oxides of nitrogen and reduction thereof

EXAMPLES

Examples 1 and 6 to 16 below illustrate the invention without in any way limiting its scope. Examples 2 to 5 describe prior art materials used to trap $NO_x$.

For comparison purposes, all of these catalysts were tested in the laboratory in a micro-unit with a synthetic gas mixture.

In all of the examples, the designation of the adsorbent phase deposited on the support (or substrate) corresponded to the sum of the elements constituting the material described in the above procedure after the loss on ignition, namely: the elements (M) contained in the centre of the oxygen octahedra, at least one element (B), and at least one optional noble element (C).

The weight contents of the different elements constituting the adsorbent phase are shown in Table 1 as a percentage. The oxygen in the oxide phases is not taken into account in the material balance.

Example 1

(Invention)

A solution containing 165 g of manganese acetate dissolved in 600 ml of distilled water and 75 ml of acetic acid was added to a solution containing 100 g of potassium permanganate in 2.250 l of distilled water. The mixture was heated under reflux for 24 hours. The precipitate was filtered then it was washed and oven dried at 100° C. Before use, it was calcined in air at 600° C.

Example 2

(Comparative)

A material for occluding $NO_x$ was prepared using the technique described in JIP 9075714, with the following formulation: $K_{1.8}Zn_{0.9}Sn_{6.2}O_{16}$ and which had a hollandite structure (verified by X-ray diffraction) and a low specific surface area.

Example 3

(Comparative)

A material for occluding $NO_x$ was prepared using the technique described in JP 9075714, with the following formulation: $K_{1.8}Zn_{0.9}Sn_{6.2}O_{16}$ and which had a hollandite structure (verified by X-ray diffraction) and a relatively high specific surface area.

Example 4

(Comparative)

A material for occluding $NO_x$ with formula $YBa_2Cu_3O_{7-x}$ was prepared using the technique described in EP-A-0 664 147, which had a perovskite structure (verified by X-ray diffraction).

Example 5

(Comparative)

The material with formula $PtBaLa$—$CeO_2$—$Al_2O_3$—$TiO_2$ as described in European patent application EP-A-0 666 103 was used to trap $NO_x$ by nitrate formation.

Example 6

(In Accordance with the Invention)

The catalyst of Example 1 was reproduced then impregnated with platinum in a proportion corresponding to 1 percent by weight. The platinum was deposited by dry impregnation from a solution of $Pt(NH_3)_4(NO_3)_2$.

TABLE I

Composition by weight of materials prepared in Examples 1 to 6

| Examples | Materials | $S_{BET}$ $(m^2/g)$ | K | Ba | La | Ce | Y | Cu | Zn | Mn | Sn | Ti | Al | Pt |
|---|---|---|---|---|---|---|---|---|---|---|---|---|---|---|
| Example 1 (inv) | K—Mn | 75 | 5.0 | | | | | | | 60.0 | | | | |
| Example 2 (comp) | Hollandite K—Sn—Zn small specific surface area | 4 | 11.2 | | | | | | 9.4 | | 58.9 | | | |
| Example 3 (comp) | Hollandite K—Sn—Zn large specific surface area | 80 | 11.2 | | | | | | 9.4 | | 58.9 | | | |
| Example 4 (comp) | YBaCuO | 4 | | 41.7 | | | 13.5 | 29.0 | | | | | | |
| Example 5 (comp) | PtBaLa—CeO$_2$—Al$_2$O$_3$—TiO$_2$ | 120 | | 18 | 3 | 11 | | | | | | 8.5 | 18.1 | 0.5 |
| Example 6 (inv) | Pt/K—Mn | 75 | 5.0 | | | | | | | 60.0 | | | | 1 |

Example 7
Results of Thermal Adsorption-desorption Tests for Oxides of Nitrogen The test materials were installed in a micro-reactor placed in the centre of a furnace. They underwent pre-treatment at 600° C. for 5 hours in a gas mixture constituted by nitrogen containing 18.5% of $O_2$ and 4% of $H_2O$. With the same mixture, these materials were brought to a temperature of 200° C. when a gaseous mixture containing oxides of nitrogen was passed for 20 minutes.

| Hourly space velocity (HSV) | 5000 h$^{-1}$ |
|---|---|
| Composition of mixture | |
| NO$_x$ | 800 ppm: NO 650 ppm, NO$_2$ 150 ppm |
| O$_2$ | 18.5% |
| H$_2$O | 4% |
| N$_2$ | complement to 100% |

After twenty minutes of adsorption, the supply of oxides of nitrogen was cut off and the materials were heated to desorb the NO$_x$:

| Hourly space velocity (HSV) | 5000 h$^{-1}$ |
|---|---|
| Composition of mixture | |
| O$_2$ | 18.5% |
| H$_2$O | 4% |
| N$_2$ | complement to 100% |
| Desorption temperature range | 200° C. to 600° C. |
| Temperature change | 10° C./min |

Table II below shows the values indicating the quantity of oxides of nitrogen adsorbed and the desorption temperature of these oxides. With the exception of the materials of Examples 4 and 6 which already contained platinum in their composition, the results shown in the columns marked "with platinum" are those of materials to which a Pt/SiO$_2$ phase had been added, equivalent to a weight percentage of 1% with respect to the total mass of the mixture. It was verified that, under our conditions, this Pt/SiO$_2$ phase did not act as an adsorbing mass for oxides of nitrogen.

TABLE II

Results of micro-unit adsorption-desorption tests at 200° C.

| | | | No Pt | | With Pt | |
|---|---|---|---|---|---|---|
| Example | Materials | Specific surface area $(m^2/g)$ | Capacity at 200° C. (mgNO/g) | $T_{des}$ (° C.) | Capacity at 200° C. (mgNO/g) | $T_{des}$ (° C.) |
| 1 (inv) | K—Mn | 75 | 3.6 | 350 & 425 | 3.2 | 350 & 425 |
| 2 (comp) | Hollandite K—Sn—Zn | 4 | 0.09 | 425 | | |
| 3 (comp) | Hollandite K—Sn—Zn | 80 | 2.0 | 410 | 1.8 | 410 |
| 4 (comp) | YBaCuO | 4 | 1.1 | 490 | | |
| 5 (comp) | Pt—Ba—Ce—La/TiO$_2$—Al$_2$O$_3$ | 120 | | | 6.1 | 570 |
| 6 (inv) | K—Mn + Pt | 75 | | | 2.5 | 340 & 420 |

It can be seen that the materials claimed by the Applicant, particularly when they do not contain a platinum phase, are more effective for adsorbing oxides of nitrogen than the comparative materials. The materials of the present invention thus have the advantage of being highly adsorbent, without the constraint of the presence of platinum. In particular, the claimed materials have a relatively low oxides of nitrogen desorption temperature, suitable for application in a diesel engine exhaust line.

Table III below summarises the values indicating the quantity of oxides of nitrogen adsorbed by the material of Example 1 under the above conditions but at different adsorption temperatures.

TABLE III

Results of $NO_x$ adsorption tests using the material of Example 1

| | Adsorption capacity (mgNO/g) at temperatures of: | | | | | |
|---|---|---|---|---|---|---|
| Material | 50° C. | 150° C. | 200° C. | 300° C. | 350° C. | 390° C. |
| Example 1 | 3.3 | 3.0 | 3.6 | 3.6 | 2.5 | 1.9 |

The adsorption capacity is hardly affected by temperature, which enables a wide range of temperatures to be used. Analysis of the gas at the outlet from the micro-reactor showed that up to their saturation, the claimed materials adsorb all of the $NO_x$ (whether NO or $NO_2$) with which they come into contact between 50° C. and the desorption temperature; for this reason, the performance of the materials of the present invention is good, even in the absence of an oxidising phase (for example supported Pt).

Example 14

Results of Thermal $NO_x$ Adsorption and Desorption Tests in the Presence of Hydrocarbons and $CO_2$ The test materials were installed in a reactor placed in the centre of a furnace. They underwent pre-treatment at 600° C. for 5 hours in a gas mixture constituted by nitrogen containing 18.5% $O_2$, 5% $CO_2$, 4% $H_2O$ and 2000 ppm of C in $C_2H_4$. In the same mixture, these materials were brought to a temperature of 200° C., where a gas mixture containing oxides of nitrogen was passed for 20 minutes.

| | |
|---|---|
| Hourly space velocity (HSV) | 50000 $h^{-1}$ |
| Composition of mixture | |
| $NO_x$ | 800 ppm: NO 650 ppm, $NO_2$ 150 ppm |
| $O_2$ | 18.5% |
| $H_2O$ | 4% |
| $CO_2$ | 5% |
| $C_2H_4$ | 2000 ppm C. |
| $N_2$ | complement to 100% |

After twenty minutes of adsorption, the supply of oxides of nitrogen was cut off and the materials were heated to desorb the $NO_x$:

| | |
|---|---|
| Hourly space velocity (HSV) | 50000 $h^{-1}$ |
| Composition of mixture | |
| $O_2$ | 18.5% |
| $H_2O$ | 4% |
| $CO_2$ | 5% |
| $C_2H_4$ | 2000 ppm C. |
| $N_2$ | complement to 100% |
| Desorption temperature range | 200° C. to 600° C. |
| Temperature change | 10° C./min |

Table IV below indicates the quantity of oxides of nitrogen adsorbed and the desorption temperature of these oxides for the material of Example 1; they are compared with the results obtained under the preceding conditions for the same material.

It can be seen that the materials claimed by the Applicant and represented by Example 1 have a comparable efficiency for adsorption of oxides of nitrogen whether the HSV is 5000 or 50000 $h^{-1}$. Further, if the mixture is rendered more complex by adding other gaseous molecules ($CO_2$, $C_2H_4$) routinely contained in exhaust gases and the size of which could allow them to become adsorbed into the channels in the materials, it can be seen that the adsorption capacity is only reduced by about 30%.

Such results suggest that the materials claimed by the Applicant can be used to trap oxides of nitrogen contained in exhaust gases, moving at high HSVs and containing gaseous molecules other than $NO_x$.

The desorption temperatures for the oxides of nitrogen trapped in the material are not significantly modified either by increasing the HSV or by the presence of other molecules adsorbed on the material.

TABLE IV

Adsorption test results

| Example | HSV ($h^{-1}$) | Composition of mixture during pre-treatment | Composition of mixture during adsorption | Capacity at 200° C. (mgNO/g) | $T_{des}$ (° C.) |
|---|---|---|---|---|---|
| 1 (inv) | 5000 | $O_2$, $H_2O$, $N_2$ | NO, $O_2$, $H_2O$, $N_2$ | 3.6 | 350 & 425 |
| 1 (inv) | 50000 | $O_2$, $H_2O$, $N_2$ | NO, $O_2$, $H_2O$, $N_2$ | 3.5 | 360 |
| 1 (inv) | 50000 | $O_2$, $CO_2$, $H_2O$, $C_2H_4$, $N_2$ | NO, $O_2$, $CO_2$, $H_2O$, $C_2H_4$, $N_2$ | 2.4 | 350 |

Example 15

Results of Adsorption and Thermal Desorption of $NO_x$ in the Presence of Sulphur-containing Molecules The test materials were installed in a micro-reactor placed in the centre of a furnace. They underwent a pre-treatment at 600° C. for 5 hours in a gas mixture constituted by nitrogen containing 18.5% $O_2$ and 4% $H_2O$. Under the same mixture, these materials were brought to a temperature of 200° C., where they were traversed for 20 minutes by a gas mixture containing oxides of nitrogen and sulphur dioxide.

| | |
|---|---|
| Hourly space velocity (HSV) | 5000 $h^{-1}$ |
| Composition of mixture | |
| $NO_x$ | 800 ppm: NO 650 ppm, $NO_2$ 150 ppm |
| $SO_2$ | 50 ppm |
| $O_2$ | 18.5% |
| $H_2O$ | 4% |
| $N_2$ | complement to 100% |

After twenty minutes of adsorption, the supply of oxides of nitrogen and sulphur was cut off and the materials were heated to desorb the $NO_x$:

| | |
|---|---|
| Hourly space velocity (HSV) | 5000 h$^{-1}$ |
| Composition of mixture | |
| $O_2$ | 18.5% |
| $H_2O$ | 4% |
| $N_2$ | complement to 100% |
| Desorption temperature range | 200° C. to 600° C. |
| Temperature change | 10° C./min |

They then underwent a second adsorption and desorption series. Table V below indicates, for the materials of Example 1, the quantity of oxides of nitrogen adsorbed and the desorption temperatures of these oxides in the presence or absence of sulphur dioxide.

TABLE V

Sulphur sensitivity evaluation

| | | 1st adsorption | | 2nd adsorption | |
|---|---|---|---|---|---|
| Examples | HSV (h$^{-1}$) | Capacity at 200° C. (mgNO/g) | $T_{des}$ (° C.) | Capacity at 200° C. (after desorption at 600° C.) (mgNO/g) | $T_{des}$ (° C.) |
| 1 (inv) no $SO_2$ | 5000 | 3.6 | 350 & 425 | 3.5 | 350 & 425 |
| 1 (inv) with $SO_2$ | 5000 | 3.2 | 355 & 420 | 3.1 | 350 & 415 |
| 5 (comp) no $SO_2$ | 5000 | 6.1 | 570 | 5.7 | 570 |
| 5 (comp) with $SO_2$ | 5000 | 4.1 | 560 | 3.0 | 560 |

The adsorption capacity for oxides of nitrogen of the materials of Example 1 was only reduced by 10% to 15% in the presence of sulphur dioxide, as opposed to 33% for the prior art material of Example 5.

The desorption temperatures of the trapped oxides of nitrogen were substantially equal to the temperatures obtained during the no-sulphur experiments.

However, the materials of Example 1 regained all of their initial adsorption capacity after thermal desorption at 600° C. (the capacity during the second adsorption was equal to the capacity of the first adsorption), which was not the case for the compound of Example 5. The $NO_x$ traps claimed by the Applicant thus have the major advantage of being capable of ready regeneration following contact with oxides of sulphur while the materials functioning to trap $NO_x$ by nitrate formation (Example 5) are poisoned by sulphate species which are extremely stable thermally.

Example 16
Results of Adsorption—Desorption Tests by Varying the Relative Mixture Strength The test materials were installed in a micro-reactor placed in the centre of a furnace. They underwent pre-treatment at 600° C. for 5 hours in a gas mixture constituted by nitrogen containing 18.5% of $O_2$ and 4% of $H_2O$ then were brought to 50° C. in the same mixture. A gas containing oxides of nitrogen the composition of which was transitory was then passed over the materials, the gas being alternately composed of a mixture which was lean in hydrocarbons for 110 seconds then a mixture which was rich in hydrocarbons for 10 sec, and were brought to different temperature stages in the range 50° C. to 600° C.

| | |
|---|---|
| Hourly space velocity (HSV) | 5000 h$^{-1}$ |
| Composition of mixture | |
| $NO_x$ | 1750 ppm: NO 1400 ppm, $NO_2$ 350 ppm |
| $O_2$ | 18.5% |
| $H_2O$ | 4% |
| $N_2$ | complement to 100% |
| Composition of rich mixture (R = 1.2) | |
| $C_2H_4$ | 2% |
| $H_2O$ | 2% |
| $N_2$ | complement to 100% |

The accompanying FIG. 1 shows the mode of operation of the material of Example 1 at the 330° C. stage.

From 200° C., injection of a hydrocarbon-rich gas desorbed all of the $NO_x$ which had previously been adsorbed during the lean operation mode.

Figure 2:
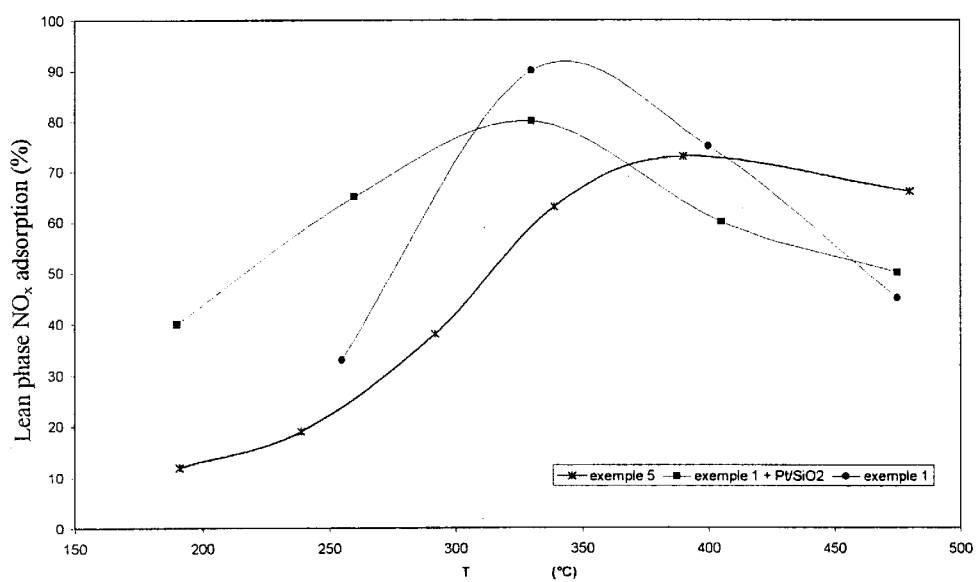

The accompanying FIG. 2 compares the effectiveness of the oxides of nitrogen adsorption for the type of material claimed by the Applicant, with or without platinum, with the material of Example 5. The Figure shows the ratio of the amount of adsorbed $NO_x$ to the ratio of the amount of $NO_x$ injected during the lean phase for each temperature stage.

Within the context of operation with chemical regeneration, it has been shown that for temperatures of 400° C. or less, the material of Example 1, with or without platinum, is that which adsorbs a maximum amount of oxides of nitrogen with a maximum effectiveness reached at temperatures of close to 300–350° C.

What is claimed is:

1. A process for eliminating oxides of nitrogen from exhaust gases, from automotive vehicle internal combustion engines, comprising contacting the exhaust gases with a material selected from materials with a cryptomelane, hollandite, romanechite or todorkite structure, comprising $MO_6$ octahedra connected together such that the structure generates micropores in the form of channels, said octahedra comprising at least one element M selected from the group consisting of elements from groups IIIB, IVB, VB, VIB, VIIB, VIII, IB, IIB and IIIA of the periodic table, said octahedra excluding tin, said material further comprising at least one element (B) selected from the group consisting of alkali-metal elements, alkaline-earth elements, rare earth elements, transition metals and elements from groups IIIA, IVA of the periodic table.

2. A process according to claim 1, wherein the average valency of the metals (M) in the octahedra is about +4.

3. A process according to claim 1, wherein said at least one element (M) is manganese, tungsten, zirconium, titanium, molybdenum or chromium.

4. A process according to claim 3, said material further comprising at least one element M selected from the group consisting of aluminum, zinc, copper, nickel, cobalt, iron, chromium, scandium and yttrium.

5. A process according to claim 1, said material further comprising at least one noble metal (C) from group VIII of the periodic table.

6. A process according to claim 5, wherein said element (C) is platinum.

7. A process according to claim 1, wherein said material comprises, as a percentage by weight:
 40% to 80% of at least one metal M;
 0.01% to 30% of at least one element (B);
 optionally, 0.05% to 5% of at least one noble metal (C) from group VIII of the periodic table.

8. A process according to claim 1, wherein said material has a specific surface in the range of 20 to 300 m²/g.

9. A process according to claim 1, wherein said material comprises at least one porous support.

10. A process according to claim 9, characterized in that the porous support is selected from the group consisting of: $SiO_2$, $Al_2O_3$, $TiO_2$, $ZrO_2$, SiC, MgO and alumino-silicate.

11. A process according to claim 1, wherein in that said material comprises at least one rigid support.

12. A process according to claim 1, wherein adsorption of the oxides of nitrogen is carried out at a temperature in the range of 50° C. to 400° C.

13. A process according to claim 12, said process further comprising a step for desorbing the oxides of nitrogen.

14. A process according to claim 13, wherein thermal desorption of the oxides of nitrogen is carried out at a temperature in the range of 300° C. to 500° C.

15. A process according to claim 12, said process further comprising a step for desorbing the oxides of nitrogen implemented by varying the gas composition.

16. A process according to claim 15, wherein chemical desorption of the oxides of nitrogen is carried out at a temperature in the range of 150° C. to 500° C.

17. A process according to claim 13, further comprising a step for reducing the oxides of nitrogen to molecular nitrogen and/or nitric oxide.

18. A process according to claim 17, wherein reduction of the oxides of nitrogen takes place in the presence of a catalyst comprising at least one inorganic refractory oxide, optionally at least one zeolite, at least one element selected from the group consisting of elements from transition metal groups VIB, VIIB, VIII and IIB, optionally at least one noble metals of group VIII, and optionally at least one element selected from the group of elements from the alkaline-earth group IIA, and the rare earth group IIB.

19. A process according to claim 17, wherein the step for adsorbing the oxides of nitrogen, the step for desorbing the oxides of nitrogen and the step for reducing the oxides of nitrogen take place in the presence of said material, the latter further comprising a noble metal from group VIII of the periodic table.

20. A process according to claim 1, wherein the internal combustion engine is a diesel engine.

21. A process for eliminating oxides of nitrogen from exhaust gases, from automotive vehicle internal combustion engines, comprising contacting the exhaust gases with a material selected from materials with a cryptomelane, hollandite, romanechite or todorkite structure, comprising $MO_6$ octahedra connected together such that the structure generates micropores in the form of channels, said octahedra comprising at least one element M selected from the group consisting of elements from groups IIIB, IVB, VB, VIB, VIIB, VIII, IB, IIIB and IIIA of the periodic table, said material further comprising at least one element (B) selected from the group consisting of alkali-metal elements, alkaline-earth elements, rare earth elements, transition metals and elements from groups IIIA, IVA of the periodic table, said material further comprising at least one noble metal (C) from group VIII of the periodic table.

22. A process for eliminating oxides of nitrogen from exhaust gases, from automotive vehicle internal combustion engines, comprising contacting the exhaust gases with a material selected from materials with a cryptomelane, hollandite, romanechite or todorkite structure, comprising $MO_6$ octahedra connected together such that the structure generates micropores in the form of channels, said octahedra comprising at least one element M selected from the group consisting of elements from groups IIIB, IVB, VB, VIB, VIIB, VIII, IB, IIB and IIIA of the periodic table, said material further comprising at least one element (B) selected from the group consisting of alkali-metal elements, alkaline-earth elements, rare earth elements, transition metals and elements from groups IIIA, IVA of the periodic table, said contacting comprising adsorbing oxides of nitrogen at a temperature in the range of 50° C. to 400° C., thermally and desorbing said oxides of nitrogen at a temperature in the range 300° C. to 500° C.°, further comprising a step for reducing the oxides of nitrogen to molecular nitrogen and/or nitric oxide, and wherein the step for adsorbing the oxides of nitrogen, the step for desorbing the oxides of nitrogen and the step for reducing the oxides of nitrogen take place in the contact with said material further comprising a noble metal from group VIII of the periodic table.

23. A process according to claim 21, wherein said element (C) is platinum.

24. A process according to claim 1, wherein said octahedral does not contain any element from group IVA of the periodic table.

* * * * *

UNITED STATES PATENT AND TRADEMARK OFFICE
CERTIFICATE OF CORRECTION

PATENT NO. : 6,551,564 B1
DATED : April 22, 2003
INVENTOR(S) : Thierry Becue et al.

It is certified that error appears in the above-identified patent and that said Letters Patent is hereby corrected as shown below:

Title page,
Item [57], ABSTRACT, reads "absorded" should read -- absorbed --

Column 15,
Line 8, delete "in that"
Line 32, reads "IIB" should read -- IB --

Column 16,
Line 8, reads "IIIB" should read -- IIB --

Signed and Sealed this

Thirty-first Day of August, 2004

JON W. DUDAS
*Director of the United States Patent and Trademark Office*